(12) United States Patent
Axelrod et al.

(10) Patent No.: US 8,211,346 B2
(45) Date of Patent: Jul. 3, 2012

(54) PAW-SHAPED TOY

(75) Inventors: Glen S. Axelrod, Colts Neck, NJ (US);
Ajay Gajria, Maharashtra (IN)

(73) Assignee: T.F.H. Publications, Inc., Neptune City, NJ (US)

( * ) Notice: Subject to any disclaimer, the term of this patent is extended or adjusted under 35 U.S.C. 154(b) by 233 days.

(21) Appl. No.: 12/684,751

(22) Filed: Jan. 8, 2010

(65) Prior Publication Data

US 2011/0169183 A1    Jul. 14, 2011

(51) Int. Cl.
*B29C 39/12*    (2006.01)
(52) U.S. Cl. ............................... 264/247; 425/DIG. 248
(58) Field of Classification Search .................. 264/247; 425/DIG. 248
See application file for complete search history.

(56) References Cited

U.S. PATENT DOCUMENTS

| | | | |
|---|---|---|---|
| 3,594,262 A * | 7/1971 | Magidson | 264/257 |
| 3,743,458 A * | 7/1973 | Hallauer et al. | 425/122 |
| 4,771,733 A | 9/1988 | Axelrod | |
| 5,148,770 A | 9/1992 | O'Rourke | |
| 5,174,243 A | 12/1992 | O'Rourke | |
| 5,339,771 A | 8/1994 | Axelrod | |
| D378,869 S | 4/1997 | Mikell | |
| D397,740 S | 9/1998 | Georgevich | |
| 5,833,788 A | 11/1998 | Mahn, Jr. et al. | |
| 6,148,771 A | 11/2000 | Costello | |
| 6,360,693 B1 | 3/2002 | Long, III | |
| D457,705 S | 5/2002 | Haslet et al. | |
| 6,442,869 B2 | 9/2002 | Coomes | |
| D466,662 S | 12/2002 | Lorkovic | |
| 6,562,271 B2 * | 5/2003 | Hiraoka et al. | 264/257 |
| 6,672,252 B2 | 1/2004 | Levin et al. | |
| 2004/0089981 A1 | 5/2004 | Byrne | |
| 2007/0098841 A1 | 5/2007 | Keehn et al. | |

FOREIGN PATENT DOCUMENTS

JP    2003117253    4/2003
* cited by examiner

*Primary Examiner* — Yogendra Gupta
*Assistant Examiner* — Alison Hindenlang
(74) *Attorney, Agent, or Firm* — Grossman, Tucker, Perreault & Pfleger, PLLC

(57) ABSTRACT

A method and apparatus is provided for molding a pet toy having one or more fabric inserts molded into a portion of the surface of the toy. The mold may comprise a cover plate, a cavity plate and a separator plate, the cavity plate including one or more projections and the separator plate including one or more complementary-shaped openings such that pieces of fabric placed on the projections may have skirt areas engaged by the engagement of the separator plate to the cavity plate. The fabric may stretch when the mold is filled with rubber or plastic to form discrete fabric-covered areas on the toy.

14 Claims, 5 Drawing Sheets

PAW-SHAPED TOY

FIELD

This disclosure relates to a method of forming a pet toy, and more particularly, to a method and apparatus for forming a pet toy having one or more fabric inserts molded into a portion of the surface of the toy.

BACKGROUND

There is a variety of chew toys available that serve the individual, as well as the combined purposes of entertaining an animal and non-invasively cleaning an animal's teeth. Animals are subject to a variety of dental problems. Often it is difficult to treat these dental problems through traditional methods, such as brushing, and a number of chew toys have been developed to treat dental problems by providing toys that create sufficient interest through entertainment, or other means, to get the animal to chew upon the toy. Providing an animal with chew toys also helps to develop the teeth and jaw of an animal and satiates the animal's desire to chew.

Examples of chew toys include but are not limited to the following. U.S. Pat. No. 6,360,693 discloses an apparatus for use as a toy by an animal that resembles a branch in appearance. U.S. Pat. No. 6,148,771 reports a chew article of elastomeric material having an outer surface with a number of groves. Furthermore, there is an interior cavity into which edible material can be held and released in a controlled manner while using the chew article. U.S. Pat. No. 5,339,771 discusses a chew toy molded from synthetic plastic. Animal meal is dispersed through out the synthetic plastic. U.S. Pat. No. 4,771,733 describes a chewable object or toy formed of a polyurethane resin with an aqueous based flavor or odor incorporated therein. These examples may provide, among other features, hard surfaces which reportedly help to provide dental prophylaxis.

Furthermore, numerous devices have been developed that use fiber or fibrous materials. Reportedly, the fibrous material also aid in improving the dental hygiene of pets by cleaning between the animal's teeth when chewed upon. Examples of such devices include, but are not limited to the following. U.S. Pat. No. 6,672,252 discloses a chew that comprises a ductile material that holds inclusions. The inclusions may contain fibers, hard components and mixtures thereof. The inclusions work in conjunction with the ductile substrate material to perform as a tooth-cleaning component or components. U.S. Pat. No. 5,174,243 discloses a chew toy that comprises a shaft portion and a pair of knuckle or end members. The knuckle or end members define recessed areas adapted to receive the ends of the shaft portion. U.S. Pat. No. 5,148,770 discloses a chew toy comprised of a pair of cattle hooves and a length of flexible cotton rope secured to and extending between the cattle hooves.

In addition to the variety of chewing desires and needs of different animals, there may also be the consideration that as one lowers the hardness of a material designated for chewing, the strength of a given chewing action may overcome the strength of the material, and the chew may be susceptible to more rapid destruction. In that regard, efforts have been made to provide a chew toy that maintains the interest of an animal in a soft chewing medium, but which soft chew medium maintains itself intact in the chewing environment.

Another consideration in the sales and marketing of chew toys, such as animal chews, may be the ability to attract the animal to play with the chew toy and to attract the owner to purchase the chew toy for the animal. Typically, the chew toy is colored by including pigments in the resin used to manufacturer the toy. It may be advantageous to provide a decorative pattern on the outer surface of the chew toy which "catches the eye" of the owner and/or animal. Molding a fabric as a portion of the outer layer of such toys may accomplish such a task.

As can be seen from the above, several variations of animal chew toys have been developed utilizing fiber combinations with polymers or animal by-products. However, a need remains to advance the state of the prior art products to improve the efficiency of molding a given chew toy and its method of manufacture such that discrete portions of the toy may include a fabric covering to enhance the dental hygiene and entertainment requirements of the animal.

There is therefore a need in the pet chew toy field for a pet chew toy that provides both entertainment and dental hygiene having rubber or polymer material and fibrous portions that may be more efficiently produced as combined in a single molding. It is an object of the present invention to provide an animal chew toy and a method to form the chew toy chew in which a fabric material may be selectively applied to a surface of the toy resulting in a chew product having rubber or polymer material and fabric portions.

SUMMARY

In a first exemplary embodiment, the present disclosure relates to a method for making a molded toy comprising providing a fabric having a front side and a backside, providing a material that is moldable with heating and providing a mold having at least three components, a cavity plate, a separator plate and a cover plate, wherein the cover plate includes one or more projections and the separator plate includes one or more openings which complement the one or more projections. This may then be followed by locating the fabric on the one or more projections and placing the separator plate onto the cover plate so that the one or more projections engage the one or more openings and the fabric is positioned over the one or more projections. This may then be followed by placing the cavity plate over the separator plate to form a closed mold and introducing the material into the closed mold and into contact with the backside of the fabric wherein the material stretches and mechanically engages said fabric. This may then be followed by solidifying the material and removing the molded toy from the mold.

The present disclosure also relates to an apparatus for providing a molded toy having discrete areas covered by fabric, comprising a mold comprising a plurality of interfacing plates, including at least a cavity plate, a separator plate and a cover plate. The cover plate includes one or more projections having peripheries and the separator plate includes one or more openings having insides which complement the one or more projections. When the separator plate is placed onto the cover plate the one or more projections engage the one or more openings, and fabric is positioned over the one or more projections and extends beyond the peripheries and is engaged between the peripheries of the projections and the insides of the openings.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Still other objects and advantages of the present invention will become readily apparent to those skilled in the art from the following detailed description, wherein it is shown and described preferred embodiments of the invention. As will be realized the invention is capable of other and different embodiments, and its several details are capable of modification in various respects, without departing from the invention. Accordingly, the description is to be regarded as illustrative in nature and not as restrictive.

Figure 1:
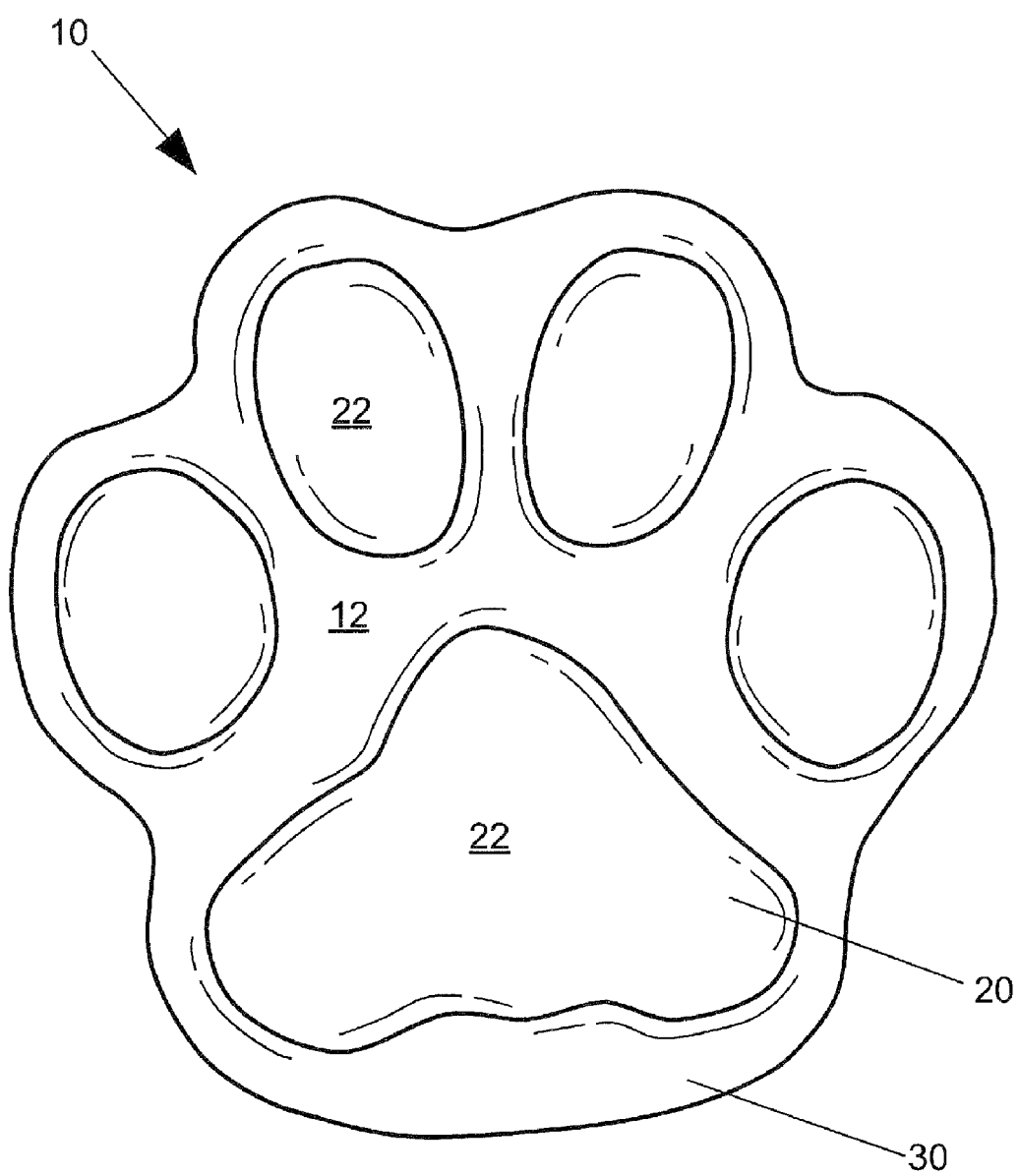
FIG. 1 is a front view of an exemplary paw-shaped rubber toy according to the present disclosure.

FIG. 1 is a front view of an exemplary paw-shaped rubber toy 10 having a rubber or polymer body 30 and discrete selected areas which are covered by a layer of fabric 20. The toy may have any shape that might interest an animal, a pet or even a child, but preferably does not include sharp edges. The front surface 12 of the toy 10 may include one or more shaped portions 22 that are covered with a layer of fabric 20. This combination of rubber or polymer and fabric may provide a different sensory experience for the user, when picked up or when chewed.

Preferably, the shaped portions 22 are convex to the surface 12 of the toy 10 and protrude slightly to give the impression of pads, for instance on the foot or paw of an animal.

The body portion may comprise any material that may be shaped with heat. In the case of a thermoplastic, repeated shaping is available. In the case of a thermoset, such materials are at least capable of being shaped at least once with heat. Similar, the edible polymers noted herein are all generally capable of being shaped with heat, particularly when an edible material, such as starch, include water, at levels between 10% by weight to 40% by weight, more preferable, 10% by weight to 20% by weight.

The thermoplastic polymer include, but not limited to, thermoplastic elastomers and thermoplastics including polyurethane, nylon, nylon copolymers, styrene-butadiene copolymers, polyether-amide copolymers, polycarbonate, polycarbonate copolymers, polyolefins, polyesters, polyacetals, thermoplastic olefin elastomers and ABS polymers.

The body portion may also comprise edible polymers such as starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between about 30-99% including all increments and values there between such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 1-2,000 µm, including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values there between such as 40%, 20%, 10%, etc.

Other edible polymers may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, thermoplastic materials, and/or thermosetting polymers.

The body portion may also comprise a thermosetting polymer, including but not limited to polyurethane, crosslinked polyesters, epoxy based polymers and vulcanized rubber.

The body portion may further comprise a rubber, including but not limited to natural rubber, such as cis- and/or trans-1.4-polyisoprene, and synthetic rubber, including but not limited to silicone rubber (—Si—O—)$_n$, methyl vinyl silicone, styrene-butadiene copolymers, acrylonitrile butadiene, isobutylene isoprene butyl, ethylene propylene, bromo isobutylene isoprene, chloro isobutylene isoprene, polychloroprene, chlorosulfonated polyethylene, epichlorohydrin, ethylene propylene diene monomer, fluorinated hydrocarbon, fluoro silicone and hydrogenated nitrile butadiene.

Further, the body portion may comprise a microcellular foam composition such as a urethane elastomer or frothed natural rubber composition which may be prepared by mixing precursors and injecting such in the forming mold against the back of the fabric. The foam composition may then be allowed to expand and force the fabric into contact with the inside surface of the forming mold.

In the case of microcellular elastomeric foam compositions, the hardness of the resulting chew toy may be varied by increasing or decreasing the amount of foam constituents that are placed in the mold, that is, the density of the resulting molded shape. For instance, molded articles may be formed having a relatively soft feel, for instance with a density of the body or foam layer portion (see 30 in FIG. 1) of 5-10 pounds per cubic foot, or having a relatively hard feel, with a density of, for instance, 60-75 pounds per cubic foot. Accordingly, the foam portion for the body portion 30 may be in the range of about 5-100 pounds per cubic foot, including all values and increments therein. Further, the foam composition that may be utilized for the core may be a thermosetting polymer (crosslinked) foam and may include greater or lesser amounts of cross-linking agents which may provide a relatively harder or softer foam due to such cross-linking. In either case, the use of urethane or natural rubber elastomers, particularly if expanded into a cellular foam, provide a relatively wide range of hardness and resiliency for a chew toy.

Accordingly, the hardness of the polymers (solid or foamed) that may be utilized as the body may have a hardness of a Shore A of about 40 to a Shore D of about 80, including all values and increments therein.

Reference to microcellular may be understood as a foamed structure that may include a plurality of relatively small pores or cells distributed substantially uniformly throughout the molded article. Such pores may have a size of about 25-250 pores per linear inch, and all values and increments therein, including 25-50 pores/linear inch, 100-150 pores/linear inch, 150-200 pores per linear inch, etc.

The fabric may comprise a woven material, a non-woven material, a spunbond material, a knitted material and mixtures thereof. The fabric may be formed of any natural or polymeric material that may be fiber forming and may have a weight per unit area of 0.15 to 15.0 ounces per square yard, including all values and increments therein. By fabric it is intended to mean a sheet structure made from fibers, filaments or yarns. Accordingly, in the broad context of the present invention, the fabric outer layer may include but not be limited to, denim, suede, canvas, burlap, corduroy, linen, jersey, or a tufted material, including carpeting, etc. It is further contemplated that the fabric may be coated with a polymeric material, such as rubber, urethane, etc. to reduce its permeability and provide additional flexibility and toughness. Preferably, the fabric material may have the ability to stretch when extended, for instance by about 0.1% to about 50% and all increments there between, such as 11%, 20%, etc.

"Stretch" as used herein refers to the ability of a fabric to increase in length when extended. The percentage, as referred to above, refers to a percentage of the length of the unstretched material.

Figure 3:
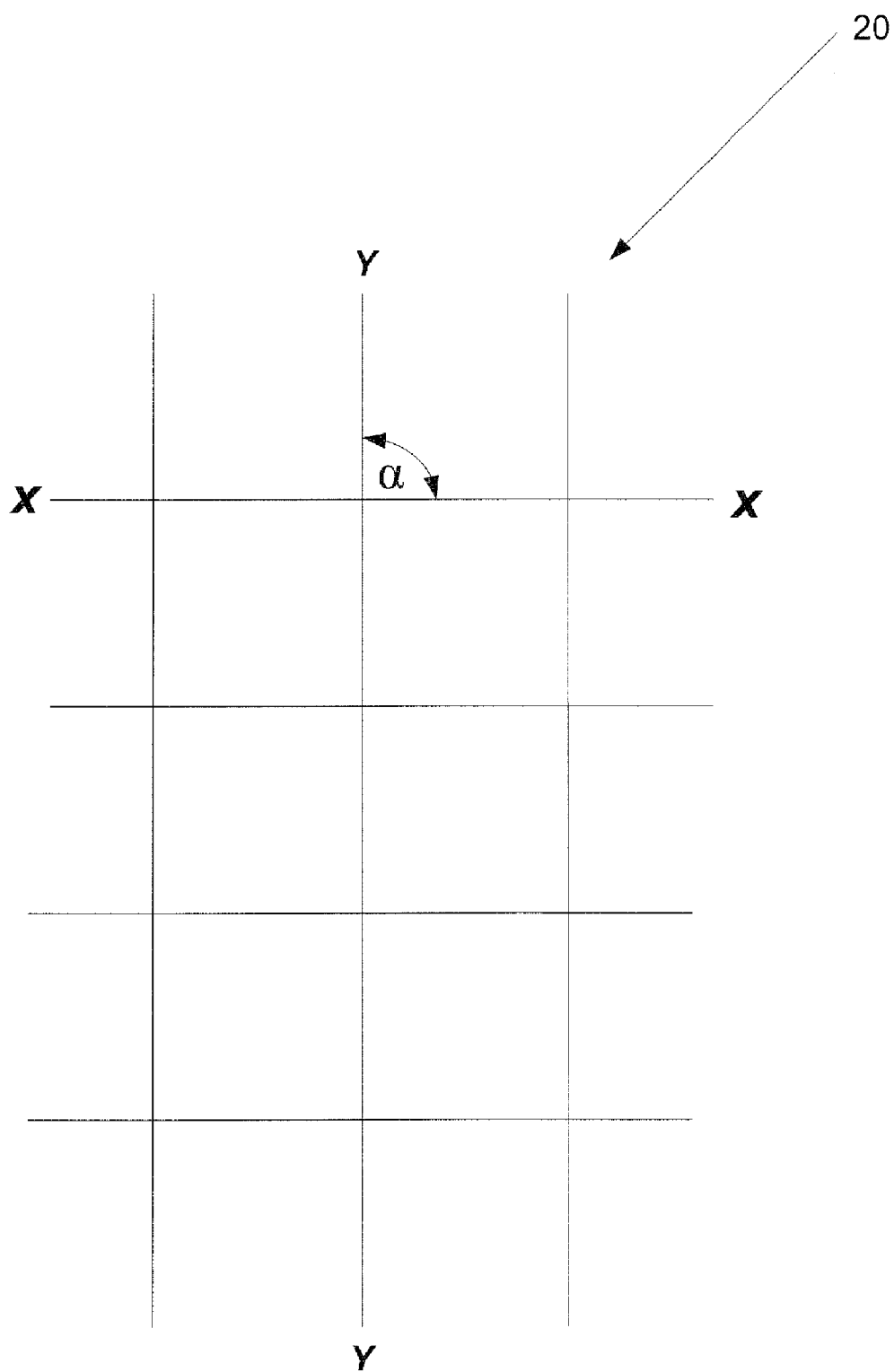
FIG. 3 is a schematic of an enlarged cross-sectional view of the fabric used in the animal chew according to the present disclosure.

Further, the fabric may include a first and a second plurality of fibers. The fibers may be capable of stretching about 0.1-50% in at least two planes with an angle α between said planes at about 1-179 degrees. FIG. 3 represents a schematic of a knitted fabric having the ability to be easily stretched in an x and/or y plane. Such fabric may, e.g. stretch in a first "x" plane and/or a second "y" plane to a level of about 0.1-50%, including all values and increments therein. It may be appreciated that the x and y planes may intersect one another at a variety of angles α of between about 1-179 degrees, including all values and increments therein. As shown in FIG. 3, a first plurality of fibers "X" may lie in one plane, for instance the x-plane and a second plurality of fibers "Y", may lie at an angle α to the first plurality of fibers. This may allow the fabric to be able to be conformed to the inside of a mold when backed by the molded polymer. Specifically, when the polymer is introduced into the mold, it may form and stretch the fabric against a mold surface. In addition, the ability of the fabric to stretch may allow for the formation of a chew toy which can be flexed. Further, due to the ability of the fabric to stretch, the fabric or pattern in the fabric may be prevented from relatively excessive distortion after molding, such as a distortion due to wrinkling (i.e. overlapping of the fabric on to itself).

The fibers which may comprise the fabric may include, but not be limited to, acrylic fibers, aramid fibers (e.g. Kevlar), modacrylic fibers, polyamide (nylon) fibers, olefin fibers, polyethylene fibers, extended chain and oriented polyethylene fibers (e.g. Honeywell's Spectra™), naphthalate fibers, polyester fibers (PET), cellulose fibers, cotton fibers or combinations thereof.

It is further contemplated that the inserts molded into the surface of the polymer may be any material that has the ability to stretch when extended and is in the form of a thin film or sheet, not just fibrous materials, but plastic, paper, foil and metal, that can be shaped by the force of the polymer being forced into the closed mold.

Figure 2:
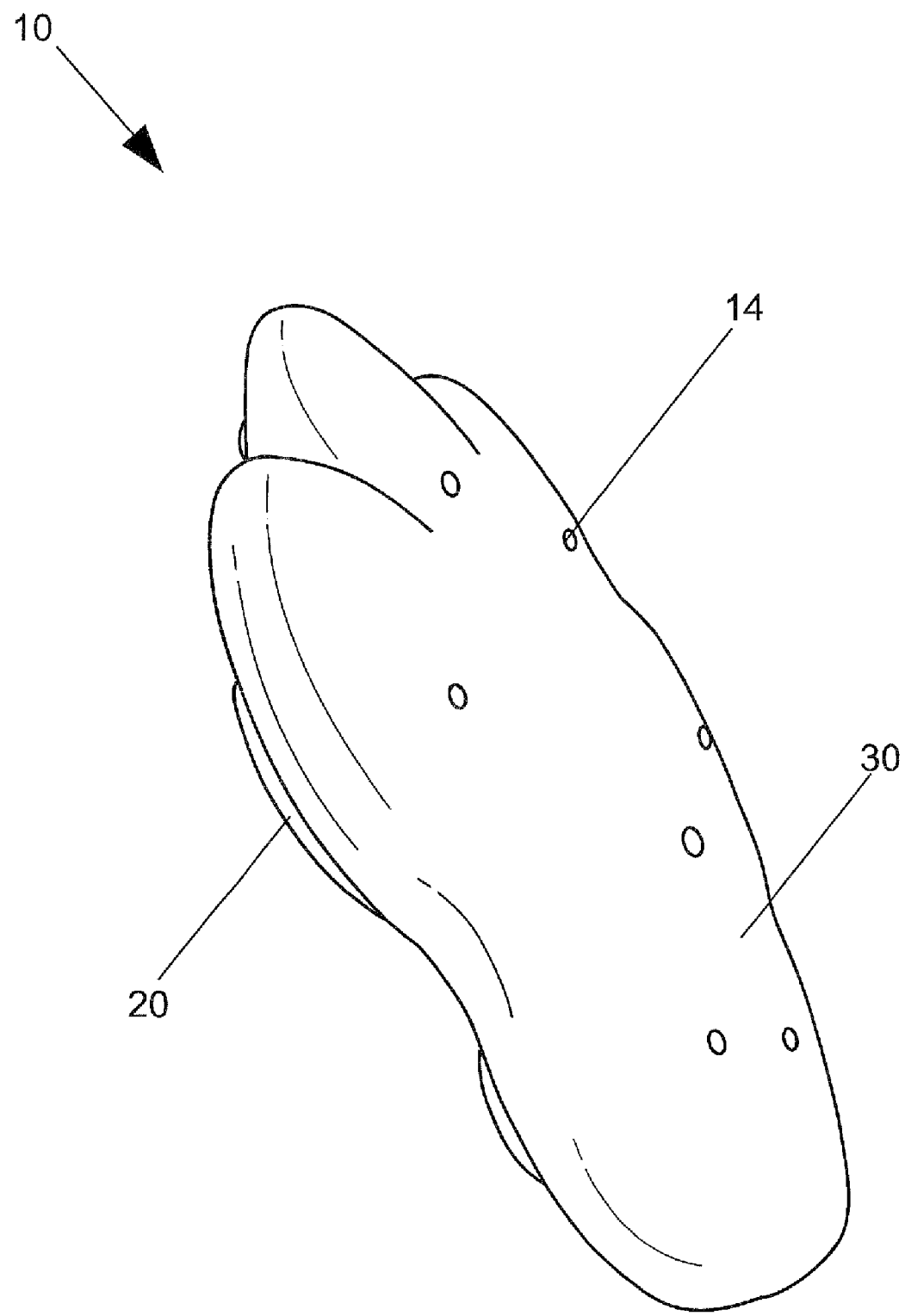
FIG. 2 is a perspective view of the backside of the paw-shaped rubber toy of FIG. 1.

FIG. 2 is a perspective view of the backside of the paw-shaped rubber toy of FIG. 1 and illustrates the relative thickness of the toy 10 and the location of a series of vent holes 14 in the mold.

Figure 4:
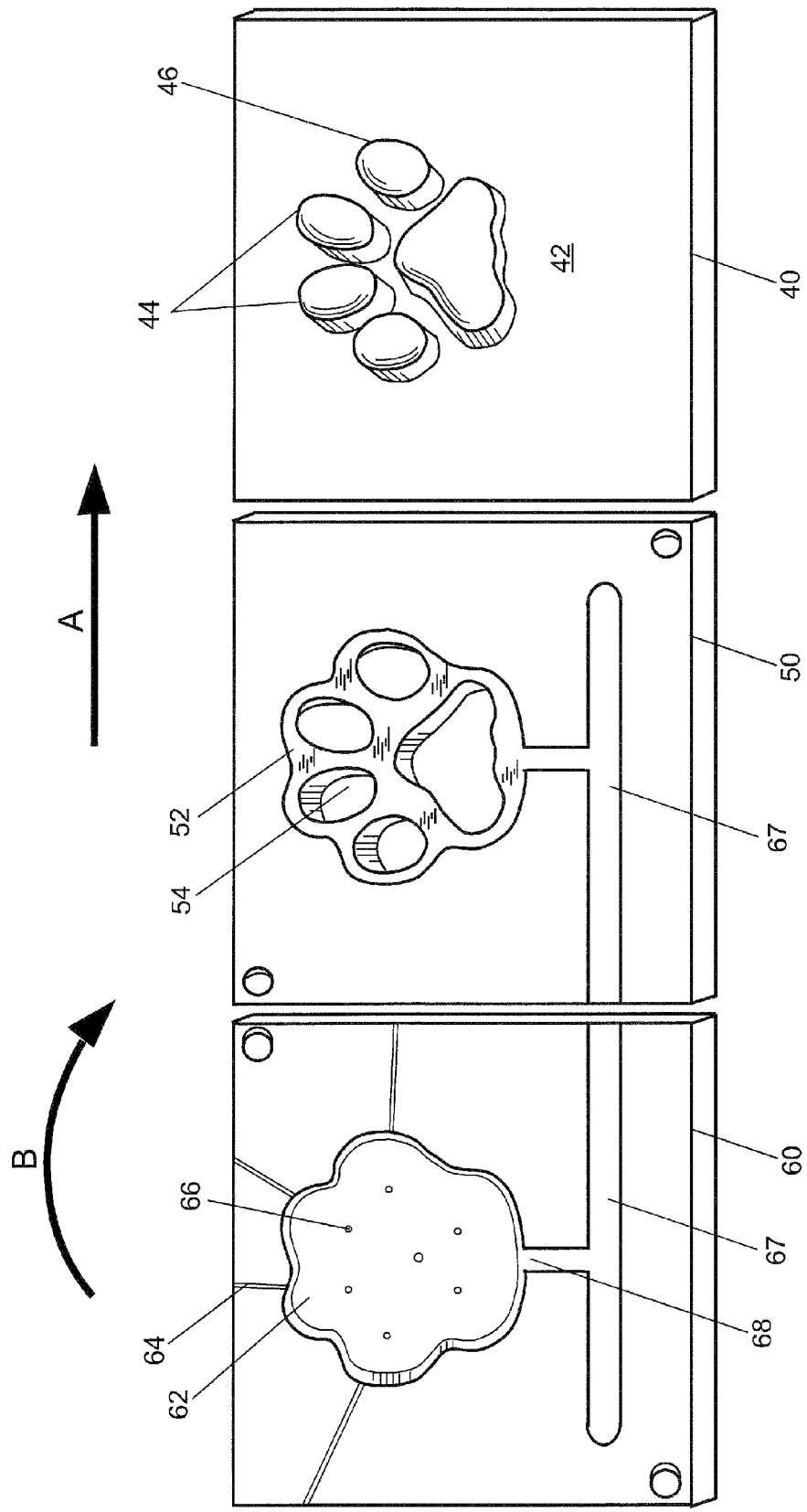
FIG. 4 is an exploded view of an exemplary three-piece mold used for forming the paw-shaped rubber toy of FIG. 1.

FIG. 4 is an exploded view of an exemplary three-component mold used for forming the paw-shaped rubber toy of FIG. 1. A mold cavity plate 40 may include a base portion 42 and one or more projections 44 which protrude from the base 42. The projections 44 may include a top surface 46 which may preferably be concave in shape. The projections 44 including the top surfaces 46 thereof may form the fabric covered shaped portions 22 of the toy 10 as described above A mold separator plate 50 may include an additional cavity portion 52 surrounding one or more openings 54. The openings 54 may be sized and shaped to be complementary to the one or more projections 44 such that the mold separator component 50 may be placed over the one or more projections 44 such that the mold cavity plate 40 and separator plate 50 engage one another and provide a relatively loose fit of the projections 44 into the openings 54. The gap between the outside of the projections and the inside surface of the openings may be in the range of about 0.1 to about 5 mm. As will be described below, this loose fit may allow fabric 20 to be placed across the concave top surface 46 of the projections 44 and when the mold is assembled, may capture the edges of such fabric between the outsides of the projections 44 and the insides of the openings 54. This fit condition further may cause the fabric to be stretched into a taut condition over the concave top surface 46 and may substantially seal any space between the projections and openings against leakage of the polymer or rubber when forced into the closed mold.

The third mold component is a mold cover plate 60 which may include a concave portion 62 as well as vents 64 and 66 to allow air to escape from the closed mold as the polymer or rubber is being injected.

Also shown, split between the cover plate 60 and the separator plate 50 is a runner system 67 for filling the mold and a gate 68.

The mold may be constructed of cast or machined steel or aluminum.

To produce the toy of the present disclosure, one or more pieces of fabric 20 may be placed over the projections 44 in the mold cavity component 40. The pieces of fabric 20 may be larger in size than the top surface 46 of the projections 44 such that a skirt portion 24 (see FIG. 4) may extend beyond the periphery of the projections and be trapped between the between the outsides of the projections 44 and the insides of the openings 54 when the separator plate 50 is engaged to the cavity plate 40. Engaging the separator plate 50 to the cavity plate 40 (see arrow A in FIG. 1), may pull the pieces of fabric taut and cause the fabric to form a gasket between the projections 44 and openings 54, such that the mold is substantially sealed from leakage in these areas.

This may be followed by inverting the cover plate 60 (from its position as shown in FIG. 1) and placing it upon the separator plate 50 (see arrow B in FIG. 1) to form a closed mold (not shown) for forming the toy 10.

This may then be followed by forcing a polymer or rubber composition through the runner system 67 and gate 68 to fill the mold, and solidification of the rubber or polymer composition.

Figure 5:
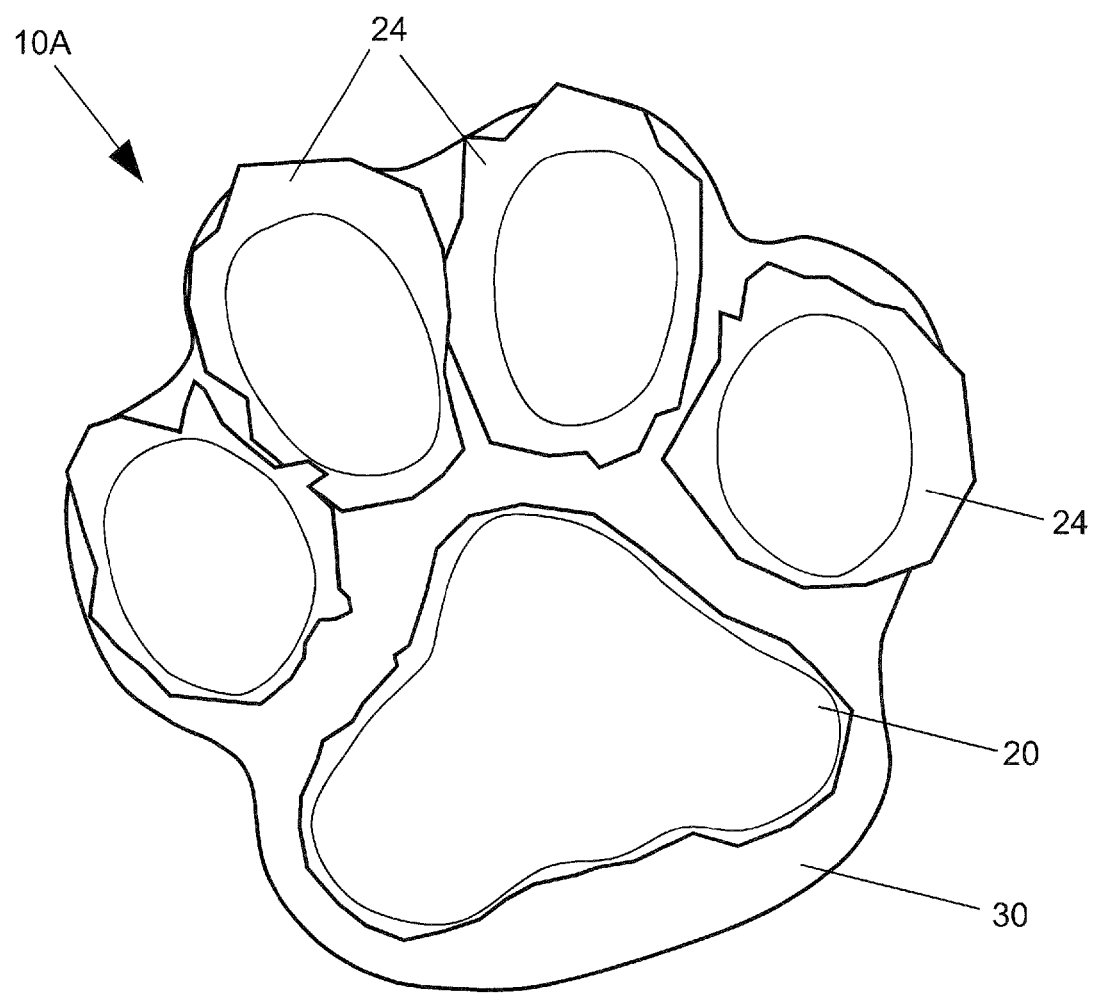
FIG. 5 is a front view of the paw-shaped rubber toy of FIG. 1 as it being removed from the three-piece mold.

Upon opening the mold, the unfinished toy 10A may be removed as shown in FIG. 5 and the skirt areas 24 of the fabric may be removed by cutting.

It is contemplated that the bond between the rubber or polymer and fabric may include one or more of mechanical engagement (penetration of the fabric by the polymer or rubber), chemical engagement (bonding of a thermosetting (curing) composition to the fabric), melt bonding (where the heat of the polymer or rubber as injected, or from a exothermic reaction, may melt a portion of the backside of the fabric)

or adhesive bonding (where the rubber or polymer contacts an adhesive layer that has been applied to the backside of the fabric). Accordingly, the attachment may include the polymer material surrounding at least partly, or even completely, various fibers and mechanically interlocking within a given fiber network.

It is further contemplated that an adhesive may be applied to the backside of the fabric, if needed, to provide adhesion between the fabric and polymer or rubber.

Example 1

In one example, silicone release agent was first sprayed onto the three mold components shown in FIG. 4. Five pieces of Clinquant velvet knitted fabric (such as 20 in FIG. 5) were placed over the projections 44 of the mold cavity component 40 (see FIG. 3). The pieces of fabric were larger than the tops of the projections (see skirt areas 24 in FIG. 5) such that when the separator plate 50 having corresponding openings 54 was placed over the projections and into contact with cavity plate 40, the skirt areas 24 of the fabric were trapped between the projections 44 and the openings 54. The mold cover plate 60 was then placed in contact with the separator plate 50 to form a closed mold. The fabric had a basis weight of about 2.5 ounces/square yard. A natural rubber compound, including colorants and odorants, was heated to about 120° C. in an injection molding machine and injected through the mold runner and gate system to fill the mold cavity space. The mold was maintained at about 120° C. After a few minutes the mold was opened and the unfinished shape shown in FIG. 5 was removed and the skirt areas 24 trimmed off to produce the toy shown in FIG. 1.

In any of the embodiments disclosed herein, it may be appreciated that attractants, such as flavorants or scents, may be added to the composition to interest the animal in chewing on the chew toy. Such attractants may be added to either the fabric or core (polymer) material, and may be used at concentrations of about 0.1-5% by weight, including all values and increments therein.

As alluded to above the body material (thermoplastic, thermosetting, rubber or edible polymer material) may be luminescent and may include a luminescent additive. Luminescence may be understood as light generated by, for example, chemical or biological change, subatomic motion, crystalline reaction, or stimulation of an atomic system. The luminescent chews may be, for example, fluorescent or phosphorescent.

Fluorescence may be understood as a process in which a high-energy photon may be absorbed and re-emitted as a lower-energy photon having a different or longer wavelength. The re-emission of the photons may occur on the order of a few seconds to a few minutes, including all ranges and increments therein, e.g. 0.01 seconds to 10 minutes. Exemplary fluorescent colorants may be based on aromatic structures such as xanthenes, rhodamines, aminonaphthalimides, perinones, and thioindigos based colorants.

Phosphorescence may be understood as a process in which energy stored in a substance is released very slowly and continuously in the form of glowing light. The release of energy stored in phosphorescent materials may be over a relatively long period of time, from a few seconds to a few hours, including up to 24 hours. Exemplary phosphorescent materials may include zinc sulfide crystals with copper and/or manganese activator; calcium and strontium sulfide activated with bismuth; crystalline structures of metal oxide aluminates, containing one or more of strontium, calcium, magnesium, barium and activated by europium and at least one or more co-activators including ytterbium, dysprosium, neodymium, samarium, thorium, thulium, erbium, etc.

The luminescent additive may be added to the core material in the range of about 0.1% to 50% by weight, including all values and increments therein. The average particle size may be between 0.1-100 microns including all increments and values therein. The luminescent additive may also be spherical or acicular in shape.

The body material may be made of a relatively clear polymeric material. For example, the body material may include a material that is capable of transmitting about or greater than 50% of visible light, including all values therein. The body material may also be capable of transmitting greater than 50% of UV radiation, including all values therein. Transmittance may be understood as the ratio of light transmitted through the material to the incident light. The body material may also have a haze of less than 50%, including all values therein. Haze may be understood as the amount of light scattered from within or from the surface of a specimen.

In addition, noise-generating or light-generating (LED) components may be integrally molded or assembled post-molding to provide other stimuli for the animal to play with the chew toy.

While illustrated in FIG. 1 as an animal paw with padded areas, the chew toy of the present disclosure may comprise nearly any shape that can be molded, including but not limited to a sphere, animal bone, cylinder, cone, prism, polygon, torus and combinations and portions thereof. In addition, other features including, but not limited to end portions, such as condyles or knuckles, projections from the surface, grooves formed in the surface, etc. may be molded into, or otherwise attached to, the chew toy.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for making a molded toy comprising:
    providing a fabric having a front side and a backside;
    providing a material that is moldable with heating;
    providing a mold having at least three components, a cavity plate, a separator plate and a cover plate; wherein said cover plate includes one or more projections, each having a periphery, and said separator plate includes one or more openings, each having an inside surface, which complement said one or more projections;
    locating said fabric on said one or more projections;
    placing said separator plate onto said cover plate so that said one or more projections engage said one or more openings and said fabric is positioned over said one or more projections, wherein a space is formed between said periphery of said one or more projections and said inside surface of said one or more openings, said space having a width dimension in the range of about 0.1 mm to about 5 mm;
    placing said cavity plate over said separator plate to form a closed mold;
    introducing said material into said closed mold and into contact with said backside of said fabric wherein said material stretches and mechanically engages said fabric;
    solidifying said material; and
    removing said molded toy from said mold.
2. The method of claim 1 wherein said fabric includes a layer of adhesive on said backside.

3. The method of claim 1 wherein said one or more projections in said mold cavity plate includes a top surface and said top surface is concave in shape.

4. The method of claim 1 wherein said fabric comprises fibrous materials such as woven material, non-woven material, spun bond material, knitted material and combinations thereof.

5. The method of claim 4 wherein said fibrous material further comprises fibers selected from the group consisting of acrylic fibers, aramid fibers (e.g. Kevlar), modacrylic fibers, polyamide (nylon) fibers, olefin fibers, polyethylene fibers, extended chain and oriented polyethylene fibers (e.g. Honeywell's Spectra™), naphthalate fibers, polyester fibers (PET), cellulose fibers, cotton fibers or combinations thereof.

6. The method of claim 1 wherein said fabric comprises denim, suede, canvas, burlap, corduroy, linen, jersey, or a tufted material, including carpeting.

7. The method of claim 1 wherein said material is a thermoplastic material.

8. The method of claim 1 wherein said material is an elastomeric material.

9. The method of claim 1 wherein said material is a thermosetting material.

10. The method of claim 1 wherein said material is microcellular foam.

11. The method of claim 1 wherein said material is cis- and/or trans-1.4-polyisoprene.

12. The method of claim 1 wherein said material is an edible polymer.

13. The method of claim 1 wherein said fabric has a basis weight in the range of about 0.15 to about 15 ounces per square yard.

14. The method of claim 1 wherein said placing of said separator plate onto said cover plate so that said one or more projections engage said one or more openings creates a space between each of said openings and said projections and said fabric substantially seals said space form leakage therethrough by said rubber or polymer material.

* * * * *